UNITED STATES PATENT OFFICE 2,415,661

BERYLLIUM BORO-PHOSPHATE GLASS

Kuan-Han Sun and Maurice L. Huggins, Rochester, N. Y., assignors to Eastman Kodak Company, Rochester, N. Y., a corporation of New Jersey No Drawing. Application March 27, 1945, Serial No. 585,187

4 Claims. (Cl. 106—47)

This invention relates to beryllium borophosphate glasses. While beryllium borate and phosphate glasses have been known, the borophosphate has not been described. As it has optical properties in a region outside those occupied by previously known commercial glasses, it promises to have definite utility in optical systems.

The glass consists wholly or predominantly of the oxides of beryllium, boron, and phosphorus.

The presence of even a small amount of boron oxide results in a glass having a lower melting range than corresponding glasses made from beryllium oxide and phosphoric oxide only. This glass also is less likely to crack on cooling, probably because of lower expansion coefficients. The glass, particularly that of low boron oxide content, is clear, hard, and colorless and has good resistance to attack by air or moisture under ordinary atmospheric conditions. Two methods of preparing the batches will be described.

Beryllium oxide in powder form is dissolved slowly by boiling it with an aqueous solution of phosphoric acid and boric acid. The resulting solution is then evaporated and a white powder of low density and apparently uniform composition obtained.

As an alternative method, the beryllium oxide is dissolved in an aqueous solution of phosphoric acid by long boiling. The solution is evaporated to dryness, yielding a white powder. This is then mixed with the powdered boron trioxide.

The powder, made by either of the above methods, is then heated at a temperature in the neighborhood of 1300° C. to 1400° C. At these temperatures a batch of 30 grams produces in from 10 to 45 minutes a melt which is neither very fluid nor very viscous. On cooling, this forms a clear, hard, colorless glass. The glass is rough-annealed at a temperature of 600° C. The batches having a high $B_2O_3$ content are more fluid and less moisture-resisting than those with less. It is to be noted that while borate or phosphate glasses can be melted in a platinum crucible, with due precautions, without damage to the crucible, the batches here described attack platinum badly. Unglazed porcelain crucibles were found satisfactory, however.

The batch compositions of seven examples follow, together with index of refraction for the D-line ($n_D$) and the Abbe value ($v$) for some of the glasses, the parts being given by weight.

| Example | BeO | $B_2O_3$ | $P_2O_5$ | $n$ | $v$ |
|---|---|---|---|---|---|
| General example | 12-25 | 2-20 | 65-85 | | |
| I | 15 | 2 | 83 | | |
| II | 25 | 5 | 70 | 1.527 | 67.5 |
| III | 20 | 5 | 75 | 1.519 | 69.0 |
| IV | 14 | 5 | 81 | 1.506 | 71.5 |
| V | 14 | 9 | 77 | 1.515 | 72.0 |
| VI | 13 | 15 | 72 | 1.519 | 70.5 |
| VII | 12 | 20 | 68 | | |

Glass VI has a partial dispersion ratio, $$\frac{n_g - n_F}{n_F - n_C}$$

of 0.520.

It is to be understood from the above description that while the composition is given in terms of the oxide, the ingredients may be introduced in other forms, as is common in the glass making art. In the above examples, for instance, the boron oxide and phosphoric oxide are introduced as boric or phosphoric acid, and these are reduced in the process to the oxides. Similarly, instead of beryllium oxide, beryllium nitrate or other salts of beryllium which yield the oxide on heating may be used.

We claim:

1. Beryllium borophosphate optical glass for which $n_D$ lies between 1.505 and 1.53 and $v$ lies between 67 and 72 and consisting of beryllium oxide, boron trioxide, and phosphoric oxide.

2. Beryllium borophosphate optical glass consisting of beryllium oxide, 12 to 25 parts; boron trioxide, 2 to 20 parts; phosphoric oxide, 65 to 85 parts.

3. Beryllium borophosphate optical glass comprising as its predominant ingredients beryllium oxide, boron trioxide, and phosphoric oxide.

4. Beryllium borophosphate optical glass for which $n_D$ lies between 1.50 and 1.54, and $v$ lies between 67 and 73, and comprising predominantly beryllium oxide, 15 to 25 parts; boron trioxide, 2 to 20 parts; phosphoric oxide, 65 to 85 parts.

KUAN-HAN SUN.
MAURICE L. HUGGINS.

REFERENCES CITED

The following references are of record in the file of this patent:

UNITED STATES PATENTS

| Number | Name | Date |
|---|---|---|
| 2,254,633 | Tillyer et al. | Sept. 2, 1941 |
| 2,298,746 | Moulton | Oct. 13, 1942 |